US010297138B2

(12) United States Patent
Reeser et al.

(10) Patent No.: US 10,297,138 B2
(45) Date of Patent: *May 21, 2019

(54) ALTERNATIVE BILLING MODES FOR SECURITY AND AUTOMATION APPLICATIONS

(71) Applicant: STATE FARM MUTUAL AUTOMOBILE INSURANCE COMPANY, Bloomington, IL (US)

(72) Inventors: Andrew Reeser, Heyworth, IL (US); Shawn M. Call, Bloomington, IL (US); Stacy L. Kennedy, Bloomington, IL (US); Lee C. Drinan, Bloomington, IL (US); Lisa A. Frey, Normal, IL (US); Kevin Payne, Lexington, IL (US); Michael Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/479,969

(22) Filed: Apr. 5, 2017

(65) Prior Publication Data

US 2017/0206773 A1 Jul. 20, 2017

Related U.S. Application Data

(63) Continuation of application No. 15/132,660, filed on Apr. 19, 2016, now Pat. No. 9,666,060, which is a
(Continued)

(51) Int. Cl.
*G07F 19/00* (2006.01)
*H04M 15/00* (2006.01)
(Continued)

(52) U.S. Cl.
CPC ....... *G08B 25/008* (2013.01); *G06Q 10/1095* (2013.01); *G06Q 30/04* (2013.01);
(Continued)

(58) Field of Classification Search
CPC ........ G06B 21/00; G06B 25/00; G06B 25/15; G06B 29/00; G06B 29/24
(Continued)

(56) References Cited

U.S. PATENT DOCUMENTS 6,829,478 B1* 12/2004 Layton ................. G08B 25/003
370/242
6,856,246 B2* 2/2005 Chicca ................... G08B 25/14
340/506
(Continued)

OTHER PUBLICATIONS

U.S. Appl. No. 14/855,911, Alternative Billing Modes for Security and Automation Applications, filed Sep. 16, 2015.

*Primary Examiner* — Olusegun Goyea
(74) *Attorney, Agent, or Firm* — Marshall, Gerstein & Borun LLP; Randall G. Rueth (57) ABSTRACT

Techniques for facilitating one or more operating modes for monitoring of an intelligent home system are disclosed. The techniques facilitate detecting an adverse condition in a building, generating an alert based on the detection, sending a notification about the alert to a user (e.g., to a mobile device), awaiting a user response, and determining whether to send the alert to a central monitoring system to facilitate notification of an appropriate responder for the adverse condition. Determining whether to send the alert to the central monitoring system may be based on an affirmative command from the user or a failure to receive any command from the user. The user may be billed for the service of notifying an appropriate responder provided by central monitoring system regularly, intermittently when the user is away from the building, or on a per-alert basis.

17 Claims, 6 Drawing Sheets

Related U.S. Application Data continuation of application No. 14/855,911, filed on Sep. 16, 2015, now Pat. No. 9,665,892, which is a continuation of application No. 14/525,607, filed on Oct. 28, 2014, now Pat. No. 9,183,578, which is a continuation of application No. 13/739,470, filed on Jan. 11, 2013, now Pat. No. 8,890,680.

(51) Int. Cl.

| | | |
|---|---|---|
| *G08B 29/00* | (2006.01) | |
| *G08B 25/00* | (2006.01) | |
| *G06Q 30/04* | (2012.01) | |
| *H04W 4/90* | (2018.01) | |
| *H04W 76/50* | (2018.01) | |
| *H04M 11/04* | (2006.01) | |
| *G06Q 10/10* | (2012.01) | |

(52) U.S. Cl.
CPC .......... *G08B 25/001* (2013.01); *H04M 11/04* (2013.01); *H04W 4/90* (2018.02); *H04W 76/50* (2018.02)

(58) Field of Classification Search
USPC ..... 340/506, 507, 531, 540, 628; 455/404.1, 455/428, 464
See application file for complete search history.

(56) References Cited

U.S. PATENT DOCUMENTS

| | | | |
|---|---|---|---|
| 7,742,762 | B1 | 6/2010 | Biere et al. |
| 8,106,769 | B1* | 1/2012 | Maroney ................ G06Q 10/10 340/540 |
| 8,380,175 | B2 | 2/2013 | Rao |
| 8,400,299 | B1 | 3/2013 | Maroney et al. |
| 8,487,765 | B1 | 7/2013 | Jordan, II |
| 8,890,680 | B2 | 11/2014 | Reeser et al. |
| 9,183,578 | B1 | 11/2015 | Reeser et al. |
| 2002/0177428 | A1* | 11/2002 | Menard ................ G08B 25/001 455/404.1 |
| 2004/0113770 | A1* | 6/2004 | Falk ................. G08B 13/19645 340/531 |
| 2004/0186739 | A1* | 9/2004 | Bolles ............. G08B 13/19656 340/506 |
| 2007/0290830 | A1* | 12/2007 | Gurley .............. G08B 13/1968 340/506 |
| 2010/0164719 | A1* | 7/2010 | George ................ G08B 25/009 340/541 |
| 2011/0032109 | A1* | 2/2011 | Fox ...................... G08B 25/006 340/628 |
| 2013/0339019 | A1* | 12/2013 | Giancarlo ............... G10L 15/04 704/251 |
| 2016/0232776 | A1 | 8/2016 | Reeser et al. |

* cited by examiner

ALTERNATIVE BILLING MODES FOR SECURITY AND AUTOMATION APPLICATIONS

CROSS REFERENCE TO RELATED APPLICATIONS

This is a continuation application that claims priority to and the benefit of the filing date of U.S. application Ser. No. 15/132,660, filed Apr. 19, 2016 and entitled "ALTERNATIVE BILLING MODES FOR SECURITY AND AUTOMATION APPLICATIONS," which is a continuation of U.S. application Ser. No. 14/855,911, filed Sep. 16, 2015 and entitled "ALTERNATIVE BILLING MODES FOR SECURITY AND AUTOMATION APPLICATIONS," which is a continuation of U.S. application Ser. No. 14/525,607, filed Oct. 28, 2014 and entitled "ALTERNATIVE BILLING MODES FOR SECURITY AND AUTOMATION APPLICATIONS," which is a continuation of U.S. application Ser. No. 13/739,470, filed Jan. 11, 2013 and entitled "ALTERNATIVE BILLING MODES FOR SECURITY AND AUTOMATION APPLICATIONS," the entire disclosures of which are incorporated herein by reference.

FIELD OF INVENTION

This disclosure generally relates to computer networking, particularly the networking of automation and/or security products in a building or home.

BACKGROUND

As computer and computer networking technology has become less expensive and more widespread, more and more devices have started to incorporate digital "smart" functionalities. For example, controls and sensors capable of interfacing with a network can now be incorporated into devices such as appliances, security systems, light switches, and water valves. Furthermore, it is possible for one or more central controllers to interface with the smart devices to facilitate automation and security applications. Such central controllers in a building may forward alerts and collected information to a central monitoring system so a monitor may call an appropriate responder to go to the building to address a security breach or other adverse condition. However, security systems have used a flat-rate, monthly billing structure in the past.

SUMMARY OF THE DISCLOSURE

Accordingly, it may be advantageous to create alternative billing modes for security and automation systems installed in buildings.

In an embodiment, a method for monitoring a building comprising: monitoring a building for adverse conditions; generating an alert when an adverse condition is detected; sending the alert to a mobile device to inform a user of the adverse condition; asking the user with the mobile device to respond to the alert by one of (i) sending a first response to deactivate the alert, or (ii) sending a second response to request one or more appropriate responders be sent to the building to address the adverse condition; if the user sent the first response, deactivating the alert; and if the user sent the second response, charging the user for requesting one or more appropriate responders to be sent to the building to address the adverse condition.

In another embodiment, a method for monitoring a building with a building monitoring system wherein the building monitoring system generates an alert when an adverse condition is detected, the method comprising: configuring the building monitoring system to a first operating mode in which the building monitoring system does not send alerts to a central monitoring system without one of (i) receiving an affirmative user command or (ii) a failing to receive a negative user command; determining that a user residing in the building will be away from the building for a certain period of time; and reconfiguring the building monitoring system to a second operating mode in which the building monitoring system sends alerts to the central monitoring system, wherein the central monitoring system responds to a received alert by charging the user for requesting one or more appropriate responders be sent to the building to address the adverse condition that was detected.

In an embodiment, a building monitoring system including a processor; and one or more program memories storing executable instructions that when executed by the processor cause the building monitoring system to: detect adverse conditions proximate to a building; generate an alert when an adverse condition is detected; send the alert to a mobile device to inform a user of the adverse condition; ask the user with the mobile device to respond to the alert by one of (i) sending a first response to deactivate the alert, or (ii) sending a second response to request one or more appropriate responders be sent to the building to address the adverse condition; if the user sent the first response, deactivate the alert; and if the user sent the second response, charge the user for requesting one or more appropriate responders to be sent to the building to address the adverse condition.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
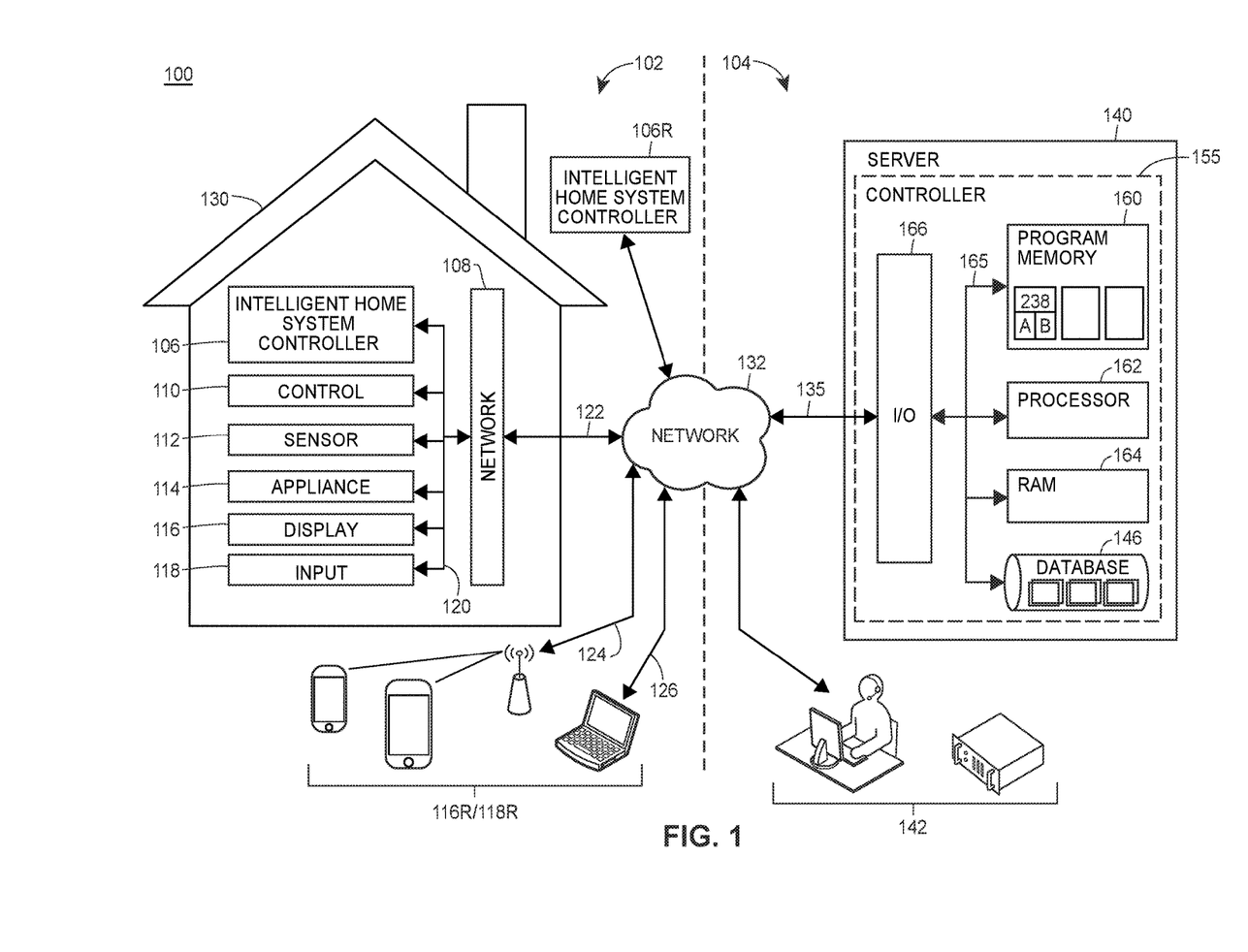
FIG. 1 illustrates a block diagram of a computer network, a computer server, an intelligent home system controller, and intelligent home system products on which an exemplary intelligent home product recommendation system and method may operate in accordance with the described embodiments.

FIG. 1 illustrates a block diagram of an exemplary intelligent home monitoring system 100. The high-level architecture includes both hardware and software applications, as well as various data communications channels for communicating data between the various hardware and software components. The intelligent home monitoring system 100 may be roughly divided into front-end components 102 and back-end components 104. The front-end components 102 may be disposed within one or more homes 130. It will be appreciated that while the word "home" is used to refer to the site at which the exemplary embodiment is installed, the exemplary intelligent home monitoring system 100 could be installed in any number of buildings or locations such as a single-family house, apartment, condominium, or even non-residential locations such as businesses or warehouses. Further, while some of the exemplary front-end components 102 are described as being disposed "within" a home, it will be understood that some or all of the front-end components 102 may be installed outside or nearby a home. Further still, some or all of the front-end components 102 (for example, the remote intelligent home system controller 106R discussed below) may be remote from the home 130 (e.g., the functions described here in as being performed by the intelligent home system controller 106 may be performed all or in part by products connected to the home 130 over the network 132 in a distributed processing or cloud computing arrangement). The front-end components 102 may include an intelligent home system controller 106, a control device 110, a sensor 112, an appliance 114, a display 116, and/or an input device 118. The front-end components 102 may also include a back-up power supply (e.g., battery, uninterruptable power supply, generator, etc.) (not shown). The front-end components 102 may be connected to each other via a link 120 and/or connected to a network 108 by the link 120. The link 120 may be a wired connection, a wireless connection (e.g., one of the IEEE 802.11 standards), an optical connection, etc.

Figure 2:
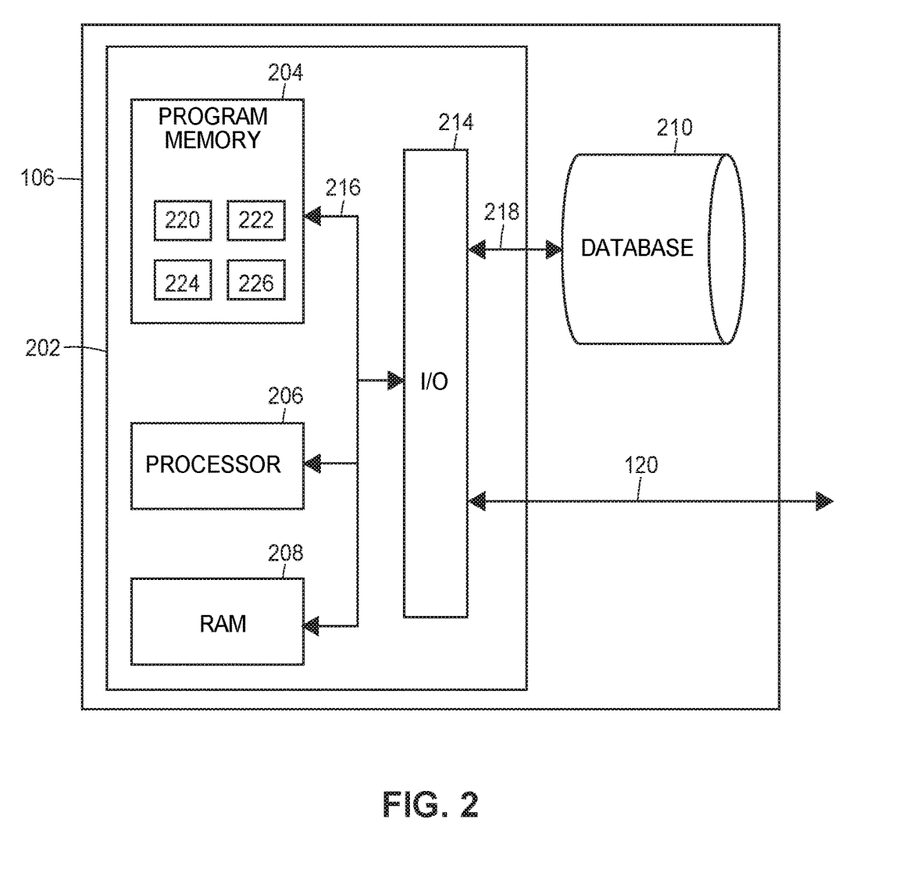
FIG. 2 illustrates a block diagram of an intelligent home system controller.

FIG. 2 illustrates a block diagram of an exemplary intelligent home system controller 106. The intelligent home system controller 106 may have a controller 202 that is operatively connected to the database 210 via a link 218. It should be noted that, while not shown, additional databases may be linked to the controller 202 in a known manner. The controller 202 may include a program memory 204, a processor 206 (may be called a microcontroller or a microprocessor), a random-access memory (RAM) 208, and an input/output (I/O) circuit 214, all of which may be interconnected via an address/data bus 216. It should be appreciated that although only one microprocessor 206 is shown, the controller 202 may include multiple microprocessors 206. Similarly, the memory of the controller 202 may include multiple RAMs 208 and multiple program memories 204. Although the I/O circuit 214 is shown as a single block, it should be appreciated that the I/O circuit 214 may include a number of different types of I/O circuits. The program memory 204 and/or the RAM 208 may include a graphical user interface 220, an intelligent home system application 222, a plurality of software applications 224, and a plurality of software routines 226. The graphical user interface 220 may be a set of instructions that when executed by the processor 206 cause the display(s) 116/116R and the input devices(s) 118/118R to display information to a user and/or receive input from the user. As used herein, the terms "user" or "customer" refers to a user of the intelligent home monitoring system 100 described below and may be used interchangeably. Furthermore, there may be more than one user of the intelligent home monitoring system 100 (e.g., a family, etc.). Further, the users may include a primary user (e.g., the owner of the home 130 who is billed for the monitoring services discussed below) and one or more authorized secondary users (e.g., a personal assistant of the primary user). It will be understood that sending an alert to the user as discussed herein may also include sending the alert to other users. Further, it will also be understood that it may be advantageous to send the alert to the primary and secondary users but only accept commands from the primary user. The intelligent home system application 222 may be a set of instructions that when executed by the processor 206 cause the intelligent home system controller 106 to carry out the functions associated with the exemplary intelligent home monitoring system 100 described herein. The monitoring operating modes described herein may be implemented as one or more modules comprising computer-executable instructions that when executed by the processor 206 cause the intelligent home system controller 106 to implement the various monitoring operating modes. These modules may be included in the intelligent home system application 222, the plurality of software applications 224, and/or the plurality of software routines 226. Further, some or all of the monitoring operating modules (or portions thereof) may be stored in the back-end components 104 and implemented by the back-end components 104.

The RAM(s) 208 and program memories 204 may be implemented as semiconductor memories, magnetically readable memories, and/or optically readable memories, for example. The controller 202 may also be operatively connected to the network 108 via a link 120. The intelligent home system controller 106 further includes a database 210 or other data storage mechanism (e.g., one or more hard disk drives, optical storage drives, solid state storage devices, etc.). The database 210 is adapted to store data related to the operation of the intelligent home monitoring system 100. Such data might include, for example, customer data collected by the intelligent home system controller 106 from the intelligent home products 110, 112, 114, 116, 118 pertaining to the intelligent home monitoring system 100 such as sensor data, power usage data, control data, input data, other data pertaining to the usage of the intelligent home products, user profiles and preferences, application data for the plurality of applications 224, routine data for the plurality of routines 226, or other kinds of data. The intelligent home system controller 106 may access data stored in the database 210 when executing various functions and tasks associated with the operation of the intelligent home monitoring system 100.

The intelligent home system controller 106 may use the graphical user interface to provide on the display 116 and/or remote display 116R information based on the data received from the intelligent home products 110, 112, 114, 116, 118. For example, the intelligent home system controller 106 may be configured to provide with the display 116 and/or remote display 116R the state of one or more control devices 110 (e.g., whether a light is on or off), a reading from a sensor 112 (e.g., whether water has been detected in the basement), the state of or a reading from an appliance 114 (e.g., whether the stove is on), etc. Additionally, or alternatively, the intelligent home system controller may use the graphical user interface to provide on the display 116 and/or remote display 116R with alerts generated from the data received from the intelligent home products 110, 112, 114, 116, 118 such as, for example, a security system alert, a fire alert, a flooding alert, power outage alert, etc. The user may acknowledge the information provided, disable alerts, forward an alert to the monitor 142 as described herein, adjust the state of a control device 110, adjust the state of an appliance 114, etc. using the display 116 and/or remote display 116R in conjunction with an input device 118 and/or remote input device 118R. For example, a user may receive an alert that the security system in his home 130 has been activated on his smartphone. Using his smartphone, the user may disable the alert or forward the alert to the monitor 142. The monitor 142 may then call the police department as discussed below. In another example, a user may use her tablet computer to check to see if she remembered to turn off the stove. The tablet computer may access the intelligent home controller 106 over the network 132 to query the current state of the stove. If she sees that the stove is on, she may input a command on her tablet computer to deactivate the stove. Of course, it will be understood that the foregoing are but two examples. Alternatively or additionally, the intelligent home system controller 106 may send the information based on the data received from the intelligent home products 110, 112, 114, 116, 118 to the server 140 over the network 132, and the server 140 may be configured to provide the information with the display 116 and/or remote display 116R. In such cases, the server 140 may act as a middleman between the intelligent home controller and the display 116 and/or remote display 116R.

Referring again to FIG. 1, as an alternative to or in addition to the intelligent home system controller 106, a remote intelligent home system controller 106R may be used to replace or augment the functions of the intelligent home system controller 106. The remote intelligent home system controller 106R may be a computer system or server connected to the network 132 by link 128. Further, the remote intelligent home system controller 106R may be implemented using distributed processing or "cloud computing" wherein the functions of the remote intelligent home system controller 106R may be performed by one or more computers or servers connected to the network 132. The remote intelligent home system controller 106R may be implemented in a server 140 in the back-end components 104 or in a similar server in the front-end components 102.

A control device 110 may be any of a number of devices that allow automatic and/or remote control of systems in the home 130. For example, the control device 110 may be a thermostat that can be adjusted according to inputs from the intelligent home system controller 106 to increase or decrease the temperature in the home 130. Such a thermostat may control the temperature in a room and/or the entire home 130. The control device 110 may also be a light switch that can be adjusted according to inputs from the intelligent home system controller 106 to turn on, turn off, brighten, and/or dim lights in the home. Such light switches may be coupled to all the lights in a room and/or an individual light fixture. The control device 110 may be an automated power outlet that can be adjusted according to inputs from the intelligent home system controller 106 to apply power and/or remove power from an outlet. Such an automated power outlet may, for example, allow for remote turning off of a television that was left on with a user command, automatic turning off of an electric stove that was left on after a threshold amount of time has elapsed since motion was detected in the home 130, automatic turning on of a lamp when motion is detected in the room, etc. Similarly, the control device 110 may be an automated circuit breaker that can be adjusted according to input from the intelligent home system controller 106 to automatically and/or remotely apply or remove power to the entire home 130. The control device 110 may be an automated water valve that can be adjusted according to inputs from the intelligent home system controller 106 to adjust the flow of water in and around the home 130 (e.g., turning on or turning off sprinklers, turning on a pump to prevent the basement from flooding, etc.). The control device 110 may be an automated gas valve that can be adjusted according to input from the intelligent home system controller 106 to adjust the flow of gas in and around the home 130. Such an automated gas valve may, for example, allow for automatic and/or remote shutting off of gas during a fire or earthquake, etc.

The sensor 112 may be any of a number of sensors that may gather information about conditions in the home 130 and/or activities in the home 130. For example, the sensor 112 may be a smoke detector which may send an input to the intelligent home system controller 106 indicating the presence of smoke in the home 130. The sensor 112 may also be a part of the thermostat discussed above which may send input to the intelligent home system controller 106 indicating the temperature in the home 130. The sensor 112 may be a water sensor which may send input to the intelligent home system controller 106 indicating, for example, the flow rate of a faucet, the presence of water in the basement, a roof leak in the attic, whether the sprinkler system is turned on, etc. The sensor 112 may be an energy monitor which may measure the power usage of a light fixture, an appliance, an entire room, the entire home 130, etc. The sensor 112 may be any of a number of security sensors. Such security sensors may include motion sensors, door sensors (to detect the opening, closing, and/or breaking of a door), window sensors (to detect the opening, closing, and/or break of a window), etc. The sensor 112 may be a camera and/or a microphone which may send visual and/or audible input to the intelligent home system controller 106.

The appliance 114 may be any of a number of appliances that may be present in the home 130 and communicating with the intelligent home system controller 106. Each appliance 114 may be a "smart" appliance. For example, the appliance 114 may have an integrated computer system that helps to optimize the operation of the appliance 114. Such an integrated computer system may assist, for example, with scheduling usage of the appliance (e.g., a smart dishwasher that will wait to run the dishwashing cycle until off-peak hours), sending usage reports to the intelligent home system controller 106, sending sensor data to the intelligent home system controller 106, receiving commands from the intelligent home system controller 106, etc. An appliance 114 may be a refrigerator, dishwasher, a washing machine, a dryer, an oven, a stove, a microwave, a coffeemaker, a blender, a stand mixer, a television, a video game console, a cable box or digital video recorder, etc. Additionally, an appliance 114 may also be a household robot (e.g., a robotic vacuum cleaner).

The display 116 may be any of a number of visual and/or audible output devices that may be used to display output from the intelligent home system controller 106. Such output may include sensor readings, alert messages, reports on the usage of various system in the home (e.g., electricity, water, etc.), a list of supplies to purchase (e.g., a smart refrigerator has reported that the milk and eggs are running out and recommends to purchase some of each), video or images from a camera, a user interface operating in conjunction with the input device 118, etc. The display 116 may also display data generated outside the home 130, such as information about weather conditions, public safety announcements, sports scores, advertisements, television channels, videos, etc. The display 116 may be a monitor (e.g., an LCD monitor, a CRT monitor), a television, a screen integrated into a control panel of the intelligent home system controller 106, a screen integrated into an appliance 114, etc. The display 116 may be used to present a graphical user interface 220 with which the user can interact with the intelligent home system controller 106. Additionally, the display 116 may also include or be connected to speakers (not shown). Such speakers may be used to present information from the intelligent home system controller 106, for example, in connection with the graphical user interface 220, an audible alert, etc. The display 116 may also be a display that is remote from the home 130. The display 116 may be a remote display 116R (e.g., a smartphone, tablet computer, or personal computer, etc.) that sends and receives information over the network 132 over a wireless connection 124 (e.g., a cellular network connection, an 802.11 connection) or a wired connection 126. The remote display 116R may include a user interface to display information about the intelligent home system to a user via an application installed on the smartphone, tablet computer, or laptop computer. The remote display 116R may receive information from the intelligent home system controller 106 and display information about one or more of the control device 110, sensor 112, appliance 114, display 116, or input device 118. For example, a user may use the application on his smartphone to receive an alert from the intelligent home system controller 106 over the wireless connection 124. Of course, it will be understood that devices other than a smartphone, tablet computer, or personal computer may be a remote display 116R.

The input device 118 may be any of a number of input devices that may be used to input data and/or commands to the intelligent home system controller 106. For example, the input device 118 may be a keyboard, mouse, remote control, etc. The input device 118 may also be integrated with the display 116, for example, as a touchscreen. The input device 118 may also be a microphone which can receive verbal commands from a user. The input device 118 may be used to receive commands in connection with the graphical user interface 220, the intelligent home system application 222, and/or any other applications or routines associated with the exemplary intelligent home monitoring system 100. The input device 118 may be a remote input device 118R (e.g., a smartphone, tablet computer, or personal computer, etc.) that sends and receives information over the network 132 over a wireless connection 124 (e.g., a cellular network connection, an 802.11 connection) or a wired connection 126. The remote input device 118R may receive user input via an application installed on the smartphone, tablet computer, or laptop computer that may present a user interface to display information about the intelligent home system and receive user input. The remote input device 118R may send commands (e.g., activate, deactivate, toggle, etc.) to the intelligent home system controller 106 to affect one or more of the control device 110, sensor 112, appliance 114, display 116, or input device 118. For example, a user may use the application on his smartphone to turn off his stove over the wireless connection 124. Of course, it will be understood that devices other than a smartphone, tablet computer, or personal computer may be a remote input device 118R.

The front-end components 102 communicate with the back-end components 104 via the network 132. For example, the intelligent home system products 106-118 situated in the home 130 may be connected to the network 132 via the home network 108 and the link 122. The link 122 may be a wired connection, a wireless connection (e.g., one of the IEEE 802.11 standards), an optical connection, etc. The remote products 106R, 116R, 118R may be similarly connected to the network 132 over respective links 128, 124, and 126. The network 132 may be a proprietary network, a secure public internet, a virtual private network or some other type of network, such as dedicated access lines, plain ordinary telephone lines, satellite links, combinations of these, etc. Where the network 132 comprises the Internet, data communications may take place over the network 132 via an Internet communication protocol. The back-end components 104 include a server 140. The server 140 may include one or more computer processors adapted and configured to execute various software applications and components of the intelligent home monitoring system 100, in addition to other software applications.

Similarly to the intelligent home system controller 106, the server 140 may have a controller 155 that is operatively connected to the database 146 via a link 156. It should be noted that, while not shown, additional databases may be linked to the controller 155 in a known manner. The controller 155 may include a program memory 160, a processor 162 (may be called a microcontroller or a microprocessor), a random-access memory (RAM) 164, and an input/output (I/O) circuit 166, all of which may be interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and program memories 160 may be implemented as semiconductor memories, magnetically readable memories, and/or optically readable memories, for example. The controller 155 may also be operatively connected to the network 132 via a link 135. The server 140 further includes a database 146 or other data storage mechanism (e.g., one or more hard disk drives, optical storage drives, solid state storage devices, etc.). The database 146 is adapted to store data related to the operation of the intelligent home monitoring system 100. Such data might include, for example, customer data collected by the intelligent home system controller 106 pertaining to the intelligent home monitoring system 100 and uploaded to the server 140 such as data pertaining to the usage of the intelligent home products, data pertaining to insurance claims filed by customers, customer profiles, information about various intelligent home products that are available for installation, web page templates and/or web pages, or other kinds of data. The server 140 may access data stored in the database 146 when executing various functions and tasks associated with the operation of the intelligent home monitoring system 100.

As shown in FIG. 1, the program memory 160 and/or the RAM 164 may store various applications for execution by the microprocessor 162. For example, a user-interface application 236 may provide a user interface to the server 140. The user interface application 236 may, for example, allow a network administrator to configure, troubleshoot, or test various aspects of the server's operation, or otherwise to access information thereon. A server application 238 operates to transmit and receive information from one or more intelligent home system controllers 106 on the network 132. The server application 238 may receive and aggregate alerts and usage data, and forward alerts to a monitor 142 as discussed herein. The server application 238 may be a single module 238 or a plurality of modules 238A, 238B. While the server application 238 is depicted in FIG. 1 as including two modules, 238A and 238B, the server application 238 may include any number of modules accomplishing tasks related to implantation of the server 140. By way of example, the module 238A may populate and transmit the client application data and/or may receive and evaluate inputs from the user to receive a data access request, while the module 238B may communicate with one or more of the back-end components 104 to fulfill a data access request or forward an alert to a monitor 142.

Additionally, the back-end components 104 may further include an intelligent home system monitor 142. The monitor 142 may be a human monitor or a computer monitor as shown in FIG. 1. The monitor 142 may receive data from the server 140 and/or the front-end components 102 over the network 132. Such data may include information from and/or about the intelligent home controller 106, control device 110, sensor 112, appliance 114, display 116, and/or input device 118. The monitor 142 may also receive this information indirectly (e.g., the server 140 may forward information to the monitor 142, the user may forward alerts to the monitor 142 with an input device 118 or remote input device 118R). If the monitor 142 receives information indicating an event potentially requiring an appropriate responder (e.g., law enforcement for a security alert, fire department for a fire alert, paramedics for a medical alert, plumber for a leak alert, power company for a power outage alert, etc.), the monitor 142 may attempt to contact the user (e.g., with a telephone call, text message, email, app alert, etc.) to verify the event potentially requiring an appropriate responder and/or notify the appropriate responder. For example, the monitor 142 may receive information from a smoke detector (i.e., a sensor 112) indicating that the home 130 may be ablaze. The monitor 142 may then attempt to contact the user to ascertain the severity of the fire and ask if the fire department should be called. If the user does not answer or if the user requests that the fire department be notified, the monitor 142 may contact the fire department and provide the fire dispatch with information about the home 130 (e.g., address, number of residents, configuration of home, etc.) and/or information about the fire (e.g., smoke detected in four rooms of the house). In another example, the monitor 142 may receive information from water valve (i.e., a control 110) indicating that the valve is open and may also receive information from a water sensor (i.e., a sensor 112) indicating that the basement has begun to flood. The monitor 142 may attempt to contact the user to notify the user and ask if remote closing of the water valve and/or calling a plumber is requested. If the user does not answer or if the user responds in the affirmative, the monitor 142 may close the water valve and/or call a plumber to prevent further flooding of the basement. It may be advantageous to call the appropriate responder without first attempting to contact the user (e.g., if the user has indicated he or she will be out of the country or in the wilderness).

Although the intelligent home monitoring system 100 is shown to include one server 140, one monitor 142, one home 130, one intelligent home system controller 106, one control device 110, one sensor 112, one appliance 114, one display 116, and one input device 118 it should be understood that different numbers of servers 140, monitors 142, homes 130, intelligent home system controllers 106, control devices 110, sensors 112, appliances 114, displays 116, and input devices 118 may be utilized. For example, the system 100 may include a plurality of servers 140 and hundreds of homes 130, all of which may be interconnected via the network 132. Further, each home 130 may include more than one of each of an intelligent home system controller 106, a control device 110, a sensor 112, an appliance 114, a display 116, and an input device 118. For example, a large home 130 may include two intelligent home system controllers 106 that are connected to multiple control devices 110, multiple sensors 112, multiple appliances 114, multiple displays 116, and/or input devices 118. Additionally several homes 130 may be located, by way of example rather than limitation, in separate geographic locations from each other, including different areas of the same city, different cities, or different states. Furthermore, the processing performed by the one or more servers 140 may be distributed among a plurality of servers in an arrangement known as "cloud computing." According to the disclosed example, this configuration may provide several advantages, such as, for example, enabling near real-time uploads and downloads of information as well as periodic uploads and downloads of information.

Figure 3:
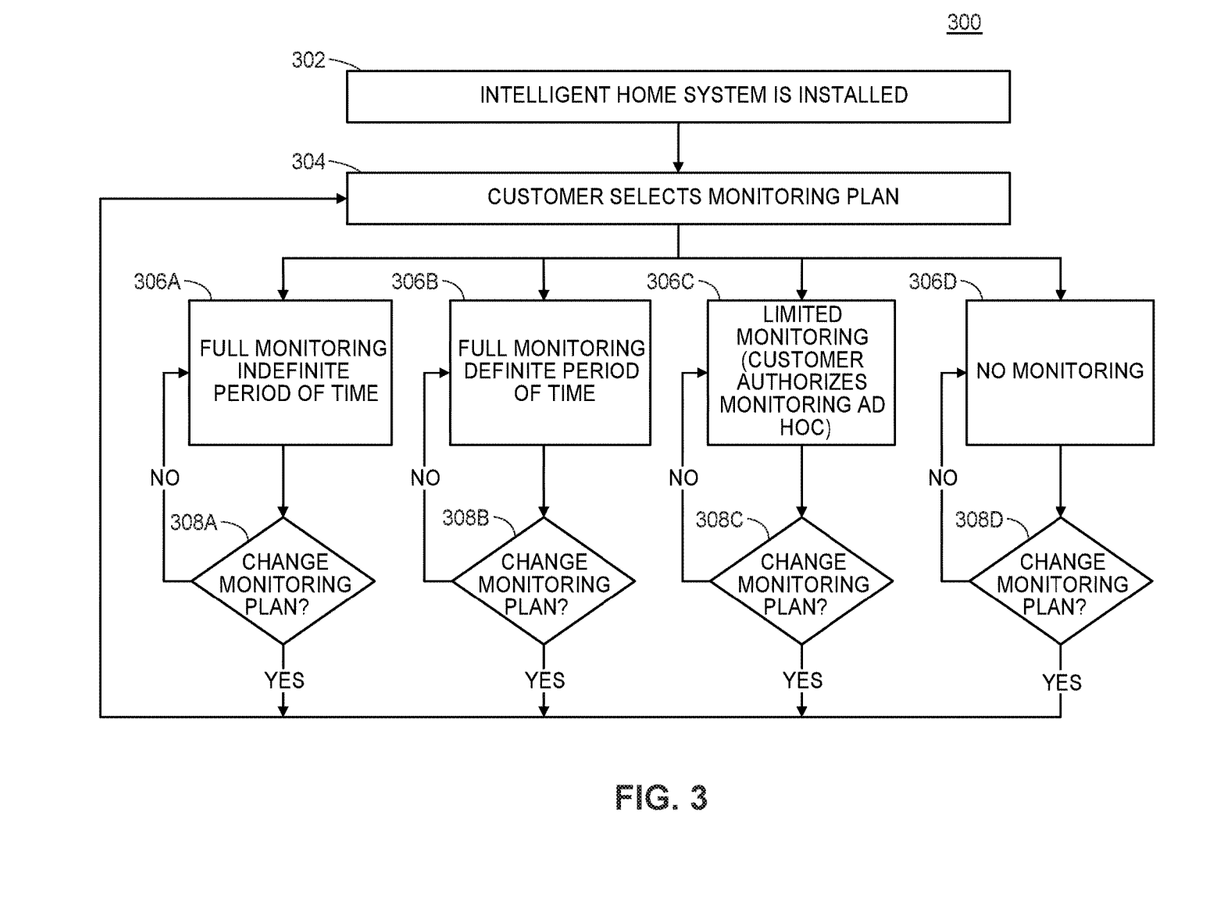
FIG. 3 illustrates an block diagram of an exemplary intelligent home system monitoring operating mode method operating in accordance with the described embodiments.

FIG. 3 is a block diagram of an exemplary intelligent home system monitoring operating mode method 300 implemented on the system 100. The intelligent home system monitoring operating mode method 300 may be implemented as one or more modules to carry out the tasks associated with the method 300. The modules may be comprised of computer-executable instructions stored on a computer (e.g., an intelligent home system controller 106, a server 140, etc.) that when executed by a processor (e.g., the processor 162, the processor 206, etc.) cause the processor to implement the tasks discussed below. Some modules may be implemented by one or both of the intelligent home system controller 106 (or remote intelligent home system controller 106R) or server 140 alone or in conjunction.

First, a customer has an intelligent home system (e.g., one or more intelligent home system controllers, control devices 110, sensors 112, appliances 114, displays 116, input devices 118, etc.) installed in his or her home 130 (block 302). Once the customer's intelligent home system is installed and powered on, the user may select a monitoring operating mode using an input device 118 or remote input device 118R (block 304). The customer may select a monitoring operating mode from among a full monitoring operating mode for an indefinite period of time (block 306A), full monitoring for a definite period of time (block 306B), limited monitoring where the customer authorizes monitoring on an alert-by-alert basis (block 306C), or no monitoring (block 306D). Each monitoring operating mode is discussed in more detail below. Once a monitoring operating mode has been selected, the monitoring operating mode is executed until it is advantageous to change monitoring operating modes (blocks 308A, B, C, D). It may become time to change monitoring operating modes when a customer inputs one or more commands with an input device 118 or remote input device 118R to change monitoring operating modes. Alternatively or additionally, the intelligent home system may be configured to execute a monitoring operating mode for a limited period of time, particularly the full monitoring for a definite period of time discussed with relation to block 306B and FIG. 4. Then, the customer may select a different monitoring operating mode (block 304).

Referring again to block 306A, a full monitoring for an indefinite period of time monitoring operating mode may include the monitor 142 receiving all (or some) of the alerts generated by the front-end components 102 for the indefinite future. The monitor 142 may contact an appropriate responder in response to every alert generated by the front-end components 102. Additionally or alternatively, the alerts generated by the front-end components 102 may be filtered or compared to a threshold level to determine whether contacting an appropriate responder is warranted (e.g., waiting to respond to a security system alert until the alert has been active for two minutes, not responding to a single smoke detector alert). As discussed above, the monitor 142 may attempt to contact the user and/or contact the appropriate responder. Being for an indefinite period of time, the full monitoring may continue until the user changes to a different monitoring operating mode or the user fails to pay for the service. The customer may be billed regularly (e.g., every week, month, year, etc.) for full monitoring and/or every time the monitor 142 contacts an appropriate responder. Relative to the full monitoring for a definite period of time operating mode discussed below, it may be advantageous to offer a discounted regular rate to users who choose full monitoring for an indefinite period of time. For example, the monthly rate for full monitoring for a definite period of time may be $100 while the monthly rate for full monitoring for an indefinite period of time may be $90.

Referring again to block 306D, the no monitoring operating mode may include the monitor 142 being sent any of the alerts generated by the front-end components 102. While the monitor 142 may not include any central monitoring services by a monitor 142 (e.g., receiving the alerts generated by the front-end components 102, contacting an appropriate responder, etc.), the user may still interact with the intelligent home monitoring system 100 via the display 116 and input device 118 and/or the remote display 116R and/or remote input device 118R. For example, the user may receive an alert on an application installed on his smartphone informing him of a security system alert. Similarly, the user may receive any number of alert notifications from the various components of the intelligent home monitoring system 100. However, the no monitoring operating mode may include some monitoring for particular adverse conditions, especially if required by federal, state, or local laws and/or regulations. In particular, the front-end components 102, may generate alerts relating to life threatening adverse conditions (e.g., fire, medical emergency, etc.) which may be received by the monitor 142. The monitor 142 may then contact the appropriate responder as discussed herein. The customer may be billed for this individual event or may be charged a nominal regular fee. However, other non-life threatening alerts may not be forwarded to the monitor 142 (e.g., a flooded basement as described herein).

Figure 4:
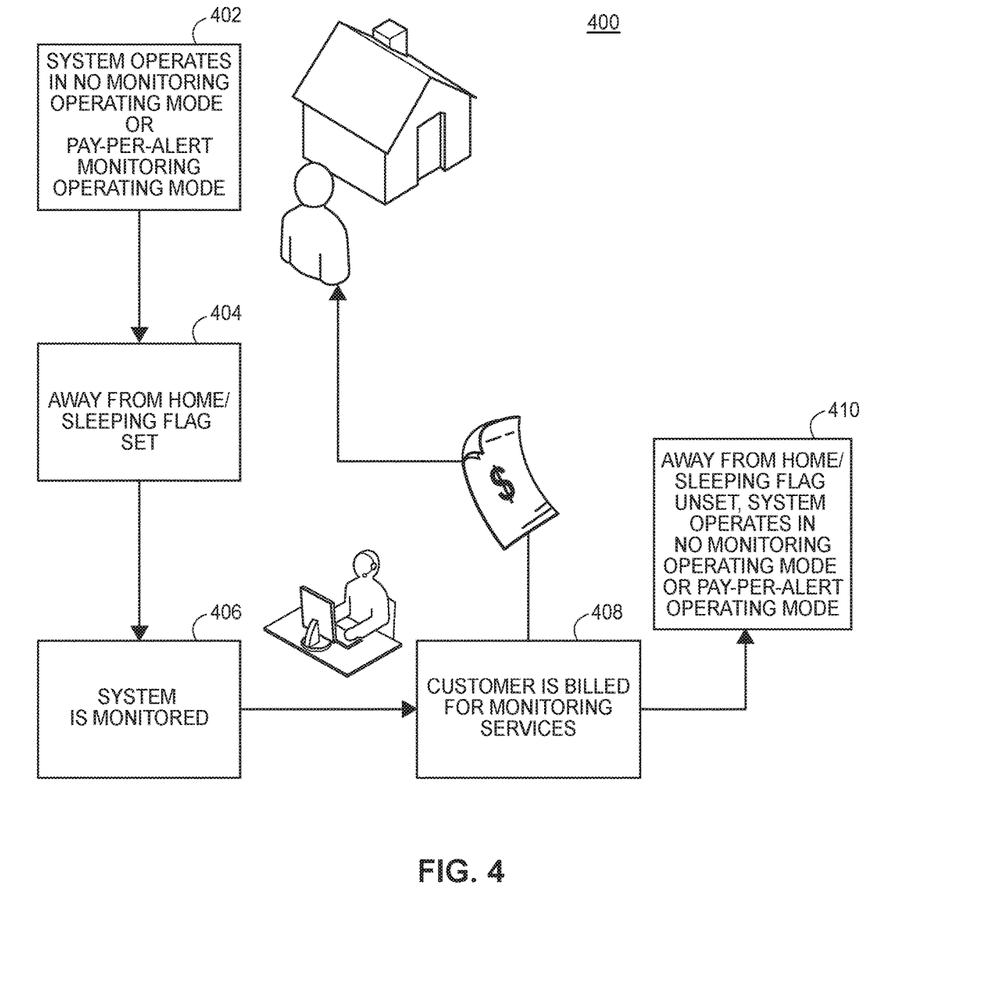
FIG. 4 illustrates an exemplary full monitoring for a definite period of time monitoring operating mode operating in accordance with the described embodiments.

FIG. 4 is a block diagram illustrating the full monitoring for a definite period of time monitoring operating mode 400 discussed in relation to block 306B. Prior to the start of the definite period of time, the intelligent home monitoring system 100 may operate according to the no monitoring operating mode or pay-per-alert operating mode discussed herein (block 402). The definite period of time may start with the setting of an Away From Home Flag (block 404). The Away From Home Flag may be a variable, flag, etc. stored on either or both of the intelligent home monitoring system controller 106, server 140, or other computer in the intelligent home monitoring system 100. The Away From Home Flag may be set by a user directly (e.g., via input to a website, phone call to the server 140 or monitor 142, input device 118, remote input device 118R, etc.) or may be set automatically by the intelligent home monitoring system 100 when the intelligent home monitoring system 100 determines that the user will be away from home for a certain period of time. For example, the intelligent home monitoring system controller 106, remote intelligent home monitoring system controller 106R, and/or server 140 may access the calendar of the user to determine that the user has a vacation, business trip, etc. planned. In particular, an application installed on the user's smartphone or tablet computer may access the calendar stored on the same device (or stored in the cloud), to detect calendar events relating to plane or train tickets, cruises, events occurring in place in places geographically distant from the home 130 (e.g., occurring in a place more than a certain number of miles away) and set the Away From Home Flag if the calendar indicates that the user is away from home. Additionally or alternatively, the application may first ask the user whether he or she would like to set the Away From Home Flag before setting it. The intelligent home monitoring system controller 106, remote intelligent home monitoring system controller 106R, and/or server 140 may also determine that the user has been away from the home 130 for a certain period of time (e.g., motion sensors in the home 130 have not detected anyone in a week) and set the Away From Home Flag. This certain period of time may be adjustable by the user.

Alternatively or additionally, the definite period of time discussed above may start with the setting of a Sleeping Flag. Like the Away From Home Flag, the Sleeping Flag may be a variable, flag, etc. stored on either or both of the intelligent home monitoring system controller 106, server 140, or other computer in the intelligent home monitoring system 100. The Sleeping Flag may be set by a user directly (e.g., via input to a website, phone call to the server 140 or monitor 142, input device 118, remote input device 118R, etc.) or may be set automatically by the intelligent home monitoring system 100 when the intelligent home monitoring system 100 determines that the user is present in the home 130 but asleep. For example, the intelligent home monitoring system controller 106, remote intelligent home monitoring system controller 106R, and/or server 140 may use various sensors 112 to determine that the user is present in the home but sleeping (e.g., by detecting the presence of a user in the bedroom but detecting little to no movement with a motion sensor at night, by detecting that a significant majority of lights in the home 130 are turned off at night, etc.). The conditions and time parameters with which the Sleeping Flag may be set may be user configurable.

When the Away From Home Flag has been set, the monitor 142 may commence full monitoring of the alerts generated by the front-end components 102 (block 406). The monitor 142 may request an appropriate responder for every alert generated by the front-end components 102. Additionally or alternatively, the alerts generated by the front-end components 102 may be filtered or compared to a threshold level to determine whether a response from the monitor 142 is warranted (e.g., waiting to respond to a security system alert until the alert has been active for two minutes). Accordingly, the monitor 142 may respond to some or all alerts received by contacting the appropriate responder without attempting to contact the user. Alternatively, the monitor 142 may attempt to contact the user before contacting the appropriate responder.

After a certain amount of time, the user may be billed for the amount of time the intelligent home monitoring system 100 has been monitored and/or level of monitoring (block 408). For example, the user may be billed weekly, monthly, etc. Additionally or alternatively, the user may be billed for every time the monitor 142 responded to an alert by contacting an appropriate responder. If full monitoring was triggered by the setting of the Away From Home Flag, full monitoring may be terminated by unsetting the Away From Home Flag (block 410). As with setting the Away From Home Flag, unsetting the Away From Home Flag may be done by a user directly (e.g., via a website, phone call to the monitor 142, input device 118, remote input device 118R, etc.) or may be set automatically by the intelligent home monitoring system 100 when the intelligent home monitoring system 100 determines that the user has returned. For example, the intelligent home monitoring system controller 106, remote intelligent home monitoring system controller 106R, and/or server 140 may access the calendar of the user to determine when the user's trip, vacation, etc. has ended. In particular, an application installed on the user's smartphone or tablet computer may access the calendar stored on the same device (or stored in the cloud), to detect calendar events relating to plane or train tickets for flights or trains back home, the end of the cruise, events occurring near the home 130, etc. and unset the Away From Home Flag when it is determined that the user is home. Additionally or alternatively, the application may first ask the user whether he or she would like to unset the Away From Home Flag before unsetting it. The intelligent home monitoring system controller 106, remote intelligent home monitoring system controller 106R, and/or server 140 may also determine that the user has been away from the home 130 for a certain period of time (e.g., a week) and set the Away From Home Flag. This certain period of time may be adjustable by the user. If full monitoring was triggered by the setting of the Sleeping Flag, full monitoring may be terminated by unsetting the Sleeping Flag. As with setting the Sleeping Flag, unsetting the Sleeping Flag may be done by a user directly (e.g., via a website, phone call to the monitor 142, input device 118, remote input device 118R, etc.) or may be set automatically by the intelligent home monitoring system 100 when the intelligent home monitoring system 100 determines that the user has awakened (e.g., by detecting increased movement of the user in the morning after detecting little movement during the night, by detecting that various appliances or devices such as the microwave or a coffee maker have been powered on, etc.). The conditions and time parameters with which the Sleeping Flag may be unset may be user configurable. Once the Away From Home Flag or Sleeping Flag has been unset, the intelligent home monitoring system 100 may be reconfigured to the no monitoring operating mode or the pay-per-alert monitoring operating mode discussed herein. The intelligent home monitoring system 100 may be reconfigured to the mode in which the intelligent home monitoring system 100 had been operating in block 402, or the intelligent home monitoring system 100 may be configured to another mode. For example, if the intelligent home monitoring system 100 had been operating in no monitoring operating mode at block 402, the intelligent home monitoring system 100 may be configured to operate in the pay-per-alert operating mode or vice versa.

Figure 5:
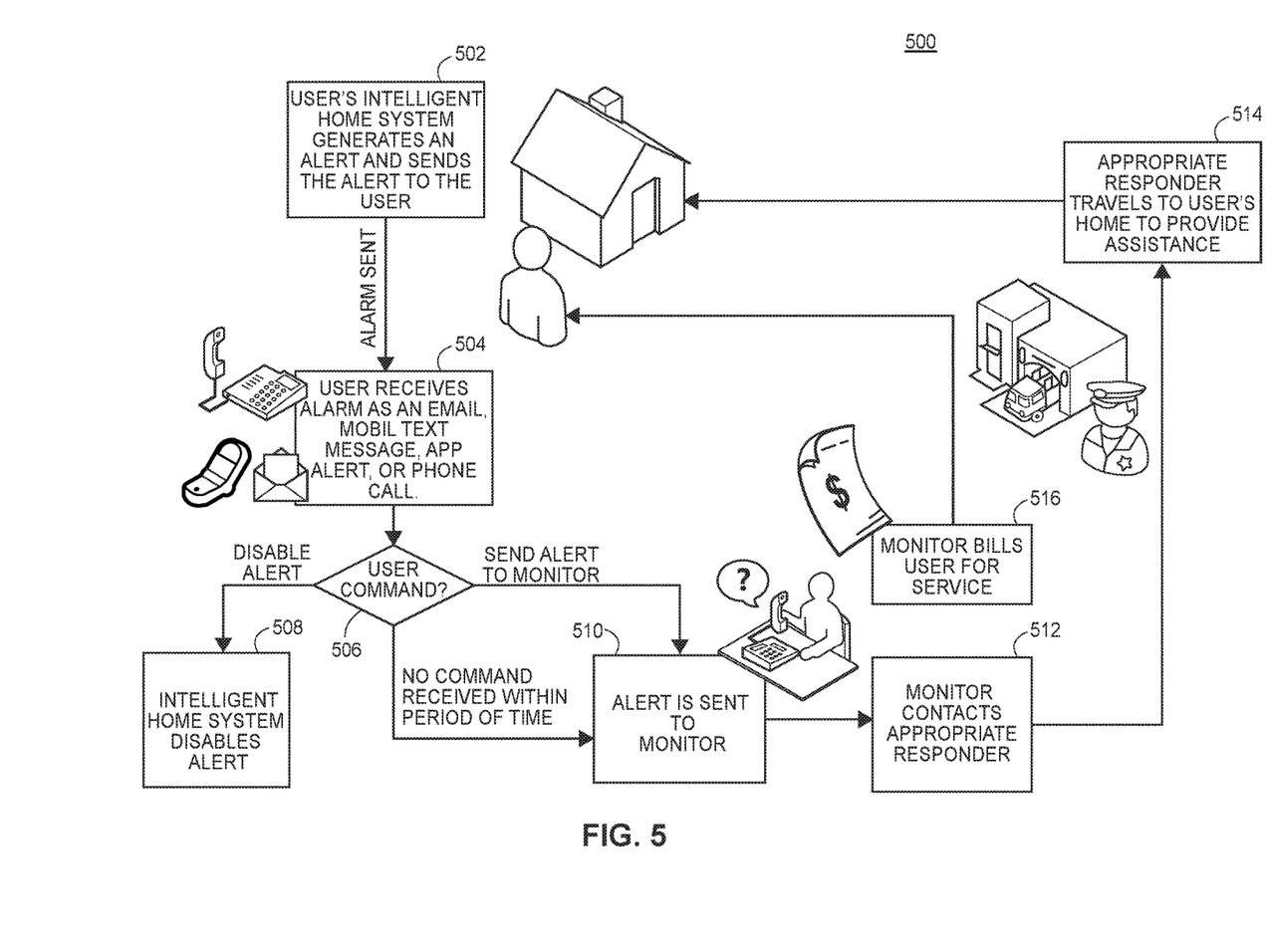
FIG. 5 illustrates an exemplary limited monitoring where the customer authorizes sending an alert to a monitor on alert-by-alert basis monitoring operating mode operating in accordance with the described embodiments.

FIG. 5 is a block diagram illustrating the limited monitoring where the customer authorizes sending an alert to a monitor on an alert-by-alert basis ("pay-per-alert") monitoring operating mode 500 discussed in relation to block 306C. First, the one or more of the front-end components 102 generates an alert (e.g., a security system alert, a fire alert, a water leak alert, etc.) (block 502). The alert may be sent to the display 116 and/or remote display 116R. Additionally or alternatively, the alert may be sent to the server 140 over the network 132 and then the server 140 may send the alert to the display 116 and/or remote display 116R. For example, the server 140 may send the alert as an e-mail, text message, phone call, application alert on a smartphone or tablet app, etc. (block 504). The alert may be received and displayed on the display 116 and/or remote display 116R. Additionally or alternatively, the alert may be included in a phone call to the user's land line telephone (not shown). Additionally or alternatively, the alert may be e-mailed to the user's e-mail address and displayed on the display 116 and/or remote display 116R.

After receiving the alert, the user has the option to disable the alert or send the alert to the monitor 142 (block 506). For example, the user may input a command on the input device 118 and/or remote input device 118R and/or telephone (not shown). In particular, the user may use an app on a smartphone or tablet computer to input a command to disable the alert or send the alert to the monitor 142. If the user selects to disable the alert, the intelligent home monitoring system 100 may disable the alert (block 508). If a user elects to send the alert to the monitor 142 or the user does not send a command within a certain period of time (e.g., two minutes after the alert is received), the alert is sent to the monitor 140 (block 510). After receiving the alert, the monitor 142 contacts the appropriate responder (block 512). Then the appropriate responder travels to the home 130 to respond to the alert (block 514). The customer may be billed for the monitor 142 contacting the appropriate responder for the alert (block 516).

Figure 6:
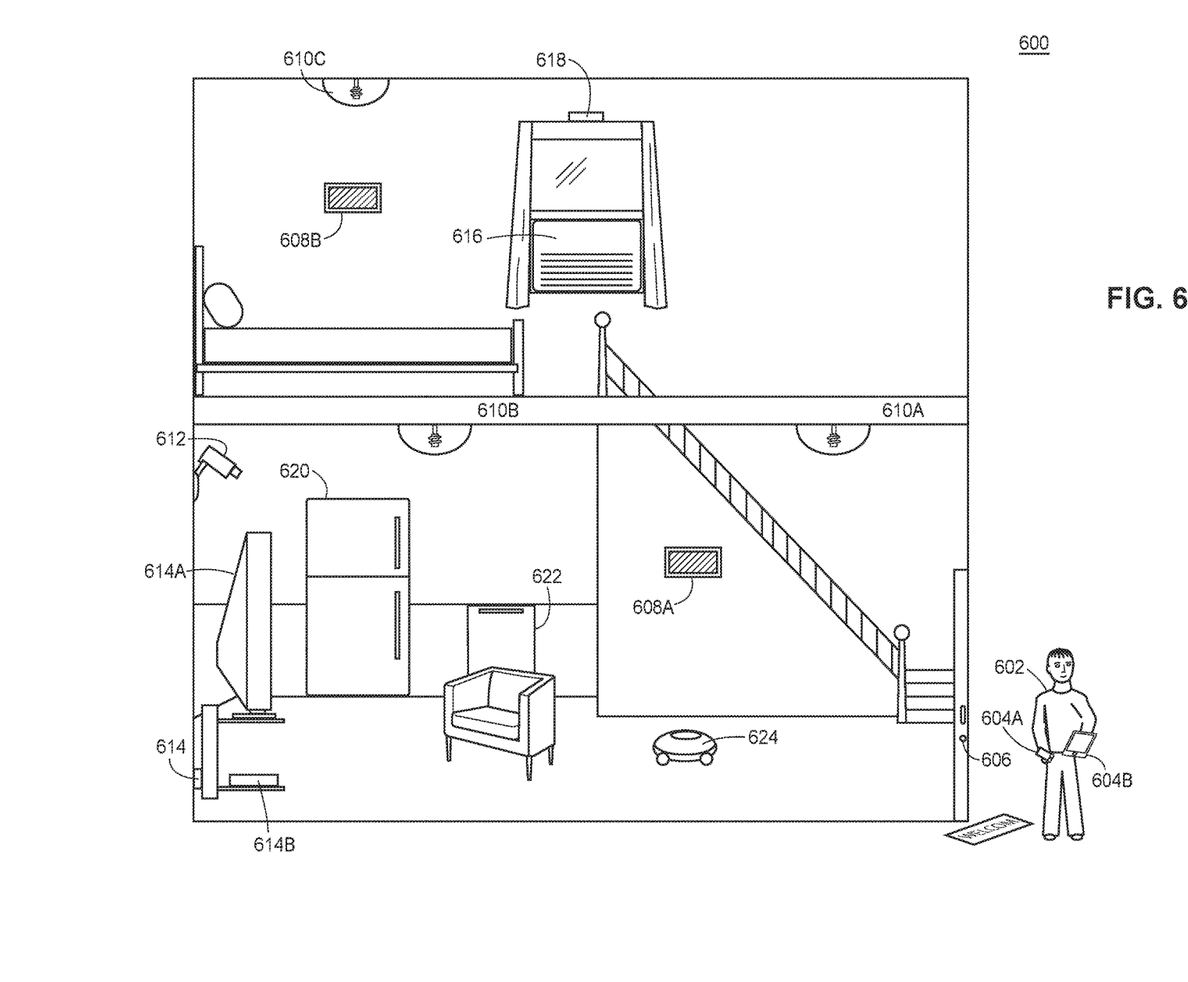
FIG. 6 illustrates a block diagram of an exemplary home with intelligent home system products installed.

FIG. 6 is an exemplary diagram of an intelligent home system 600 installed in a home that may collect customer usage data to send to a server 140 (or other back-end component 104). A user 602 may remotely interact with the intelligent home system 600 using a mobile device 604. Such a mobile device 604 may include, for example, a mobile phone 604A, a tablet computer 604B, etc. The intelligent home system 600 may include an intelligent lock 606. Such an intelligent lock 606 may include a sensor to detect the state of the intelligent lock 606 (e.g., locked or unlocked) and/or a control mechanism to respond to commands from the intelligent home system 600 (e.g., a remote command to lock the door). The intelligent home system 600 may include one or more intelligent home control panels 608 such as the downstairs home control panel 608A and the upstairs intelligent home control panel 608B as shown in FIG. 6. The intelligent home control panel 608 may include a display and/or input product (e.g., a touchscreen) and may perform the functions of an intelligent home system controller 106 as described above. Such an intelligent home control panel 608 or a mobile device 604 may be used to receive user input to the intelligent home monitoring system 100 as described above. The intelligent home system 600 may include one or more lights 610 (e.g., the three lights 610A, B, C as shown in FIG. 6). Such intelligent lights 610 may include a sensor component to detect, for example, when a light 610 is on or off, and/or a control component to allow remote control of the intelligent light 610. The intelligent home system 600 may also include a camera or motion sensor 612. The intelligent home system 600 may further include an intelligent outlet 614. Such an intelligent outlet 614 may include a sensor component to detect, for example, when the outlet 614 is on or off, and/or a control component to allow remote control of the intelligent outlet 614. The intelligent outlet 614 may be coupled to a television 614A and/or game system 614B. The intelligent outlet may therefore detect when the television 614A and/or game system 614B are turned on or off and/or allow the user 602 to remotely power on or power off either or both of the television 614A and game system 614B. The intelligent home system 600 may also include one or more air conditioners 616, window sensors 618, refrigerator 620, and/or dishwasher 622. Some or all of the air conditioner 616, window sensor 618, refrigerator 620, and dishwasher 622 may be intelligent such that they are able to send a sensor data to the intelligent home system 600 and/or receive commands from the intelligent home system 600.

In an example, the user 602 has configured the intelligent home monitoring system 100 to use the pay-per-alert monitoring operating mode, and he may receive the various alerts generated by the intelligent home monitoring system 100 at his smartphone 604A and/or his tablet computer 604B. If the window sensor 618 has detected a window breakage, the intelligent home monitoring system 100 may generate a break-in alert and send the break-in alert to an app installed on the smart phone 604A and/or tablet computer 604B. The user 602 may elect to send the alert to the central monitoring system (e.g., the monitor 142 shown in FIG. 1) to call the police to respond to a break-in. Alternatively, the user 602 may have been playing catch with another person and accidentally threw a baseball through the window, in which case he may disable the alert.

In another example, if the user 602 has configured the intelligent home monitoring system 100 to use the full monitoring for a definite period of time monitoring operating mode, the intelligent home monitoring system 100 may send alerts to the monitor 142 during the time when the user is away from the home. The user 602 may use the smartphone 604A, tablet computer 604B, and/or intelligent home monitoring system panel 608 to inform the intelligent home monitoring system 100 and that he will be on vacation for the next two weeks. Alternatively, the intelligent home monitoring system app installed on the smart phone 604A and/or tablet computer 604B may access the user's calendar and detect entries for a flight from Chicago to Hawaii and a flight from Hawaii to Chicago two weeks later. The intelligent home monitoring system 100 may determine that the user 602 will be taking a two-week vacation to Hawaii. The intelligent home monitoring system app may then ask the user 602 if he would like to enable full monitoring for the next two weeks. During the user's trip to Hawaii, the intelligent home monitoring system panel 608 may send all the alerts generated by the system 600 to a monitor 142. The monitor 142 may contact an appropriate responder for every alert.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory product to which it is communicatively coupled. A further hardware module may then, at a later time, access the memory product to retrieve and process the stored output. Hardware modules may also initiate communications with input or output products, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed:

1. A method for monitoring a building using a building monitoring system, the method comprising:
   (i) while the building monitoring system is operating in a first operating mode included in a plurality of operating modes, receiving a trigger corresponding to operating the building monitoring system in a second operating mode included in the plurality of operating modes,
   the plurality of operating modes including a particular operating mode in which the building monitoring system does not send, to a central monitoring system, a respective alert corresponding to a respective detected adverse condition without one of (i) receiving an affirmative user command in response to a notification of the respective detected adverse condition, or (ii) failing to receive a negative user command in response to the notification within a time interval, and wherein a user is charged when the respective alert is sent to the central monitoring system; and
   an operating mode in which the building monitoring system sends, to the central monitoring system, alerts corresponding to detected adverse conditions, and in which the building monitoring system charges a rate based every alert the user chooses to send from the building monitoring system to the central monitoring system within a time period; or
   an operating mode in which the building monitoring system does not send any alerts to the central monitoring system for non-life threatening situations; and
   (ii) reconfiguring the building monitoring system to operate in the second operating mode upon receiving the trigger.

2. The method of claim 1, wherein receiving the trigger corresponding to operating the building monitoring system in the second operating mode comprises obtaining an indication of whether or not any people are or are expected to be present in the building.

3. The method of claim 1, wherein receiving the trigger corresponding to operating the building monitoring system in the second operating mode comprises obtaining an indication of whether or not any people are or are expected to be sleeping or confined to an area of the building.

4. The method of claim 1, wherein receiving the trigger corresponding to operating the building monitoring system in the second operating mode comprises detecting a start or an end of an event stored on an electronic calendar.

5. The method of claim 1, wherein receiving the trigger corresponding to operating the building monitoring system in the second operating mode comprises receiving a user command at the building monitoring system.

6. The method of claim 1, wherein receiving the trigger corresponding to operating the building monitoring system in the second operating mode comprises obtaining data generated by one or more sensors disposed within the building.

7. The method of claim 1, wherein receiving the trigger corresponding to operating the building monitoring system in the second operating mode comprises receiving a trigger that excludes any user input received at a user interface of the building monitoring system.

8. The method of claim 1, wherein receiving the trigger corresponding to operating the building monitoring system in the second operating mode comprises detecting a change in an operating state of a device or appliance disposed in the building.

9. The method of claim 1, wherein the respective detected adverse condition includes at least one of: fire, water damage, theft of goods from the building, entry into the building, or a power outage.

10. A building monitoring system that is communicatively connected to a central monitoring system, the building monitoring system comprising:
   one or more interfaces via which user commands are received;
   one or more processors; and
   computer-executable instructions that are stored on a memory and that, when executed by the one or more processors, cause the building monitoring system to:
   (i) while the building monitoring system is operating in a first operating mode included in a plurality of operating modes, receiving a trigger corresponding to operating the building monitoring system in a second operating mode included in the plurality of operating modes,
   the plurality of operating modes including a particular operating mode in which the building monitoring system does not send, to a central monitoring system, a respective alert corresponding to a respective detected adverse condition without one of (i) receiving an affirmative user command via the one or more interfaces in response to a notification of the respective detected adverse condition, or (ii) failing to receive a negative user command via the one or more interfaces in response to the notification within a time interval, and wherein a user is charged when the respective alert is sent to the central monitoring system; and
   an operating mode in which the building monitoring system sends, to the central monitoring system, alerts corresponding to detected adverse conditions, and in which the building monitoring system charges a rate based every alert the user chooses to send from the building monitoring system to the central monitoring system within a time period; or
   an operating mode in which the building monitoring system does not send any alerts to the central monitoring system for non-life threatening situations; and
   (ii) reconfiguring the building monitoring system to operate in the second operating mode upon receiving the trigger.

11. The building monitoring system of claim 10, wherein the respective detected adverse condition includes at least one of: fire, water damage, theft of goods from the building, entry into the building, or a power outage.

12. The building monitoring system of claim 10, wherein the reception of the trigger includes one of:
   a reception of an indication of whether or not any people are or are expected to be sleeping or confined to an area of the building; or
   a reception of an indication of whether or not any people are or are expected to be present in the building.

13. The building monitoring system of claim 10, wherein the reception of the trigger includes a detection of an entry stored in an electronic calendar or other electronic application.

14. The building monitoring system of claim 10, wherein the reception of the trigger corresponds to at least one of: data generated by one or more sensors disposed in the building, or a change in an operating state of a device or appliance disposed in the building.

15. The building monitoring system of claim 10, wherein the reception of the trigger corresponds to a reception of a user command received via the one or more interfaces of the building monitoring system.

16. The building monitoring system of claim 10, wherein the central monitoring system contacts one or more responders in response to receiving one or more alerts from the building monitoring system.

17. The building monitoring system of claim 16, wherein the central monitoring system contacts the one or more responders based on a comparison of the one or more received alerts and a threshold level.

* * * * *